(12) United States Patent
Peters et al.

(10) Patent No.: US 8,848,849 B1
(45) Date of Patent: Sep. 30, 2014

(54) SPDIF CLOCK AND DATA RECOVERY WITH SAMPLE RATE CONVERTER

(71) Applicant: Avnera Corporation, Beaverton, OR (US)

(72) Inventors: Samuel J. Peters, Beaverton, OR (US); Eric P. Etheridge, Beaverton, OR (US); Victor Lee Hanson, Portland, OR (US); Alexander C. Stange, Portland, OR (US)

(73) Assignee: Avnera Corporation, Beaverton, OR (US)

( * ) Notice: Subject to any disclaimer, the term of this patent is extended or adjusted under 35 U.S.C. 154(b) by 15 days.

(21) Appl. No.: 13/800,557

(22) Filed: Mar. 13, 2013

(51) Int. Cl.
*H04L 7/02* (2006.01)

(52) U.S. Cl.
USPC .......................................................... 375/359

(58) Field of Classification Search
CPC ................... H04L 25/03885; H04L 25/03866; H04L 7/0331
USPC .......................................................... 375/359
See application file for complete search history.

(56) References Cited

U.S. PATENT DOCUMENTS

| | | | |
|---|---|---|---|
| 3,950,616 A * | 4/1976 | Tammaru | 375/365 |
| 4,558,422 A * | 12/1985 | DenBeste et al. | 702/57 |
| 5,159,339 A | 10/1992 | Fujita | |
| 5,245,667 A | 9/1993 | Lew | |
| 5,559,513 A | 9/1996 | Rothermel et al. | |
| 5,802,119 A * | 9/1998 | Jung et al. | 375/354 |
| 7,230,651 B2 | 6/2007 | Schoner et al. | |
| 7,436,333 B2 | 10/2008 | Forman et al. | |
| 8,068,174 B2 | 11/2011 | Schoner | |
| 2005/0077932 A1 * | 4/2005 | Duncan | 327/141 |
| 2005/0163276 A1 | 7/2005 | Sudo et al. | |

OTHER PUBLICATIONS

AD1892 Integrated Digital Receiver/Rate Converter data sheet (Rev. 0), Analog Devices, 1998, 24 pages.
P. Lesso, "A high-performance S/PDIF receiver," Audio Engineering Society Convention Paper, San Francisco, CA, Oct. 5-8, 2006, 6 pages.

* cited by examiner

*Primary Examiner* — Juan A Torres
(74) *Attorney, Agent, or Firm* — Patrick D. Boyd; Paul B. Heynssens; Ater Wynne LLP

(57) ABSTRACT

A system and a technique for recovering data from an input data stream without synchronization of an input sampling circuit to the input data stream determines a count of incoming samples (or frames) without generating a signal that is frequency-locked to the input data stream. A first clock is generated comprising a frequency that is greater than or equal to an expected frequency of the input data stream. A sample count is incremented in response to a sample received in the input data stream, and is decremented in response to a second clock signal. The second clock is generated the first clock signal by passing the first clock signal if the sample count of the sample counter does not equal a predetermined sample count value and by blocking the first clock signal if the sample count equals the predetermined sample count value.

20 Claims, 3 Drawing Sheets

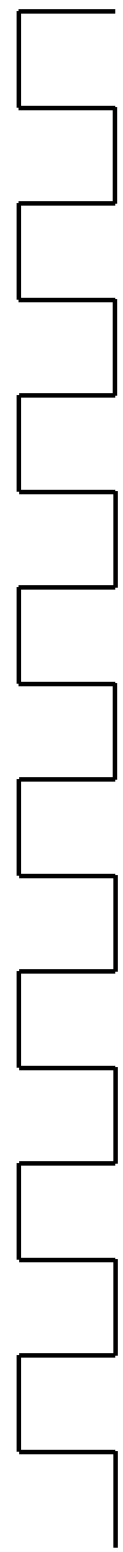
FIG. 2A RATE GENERATOR CLOCK 119
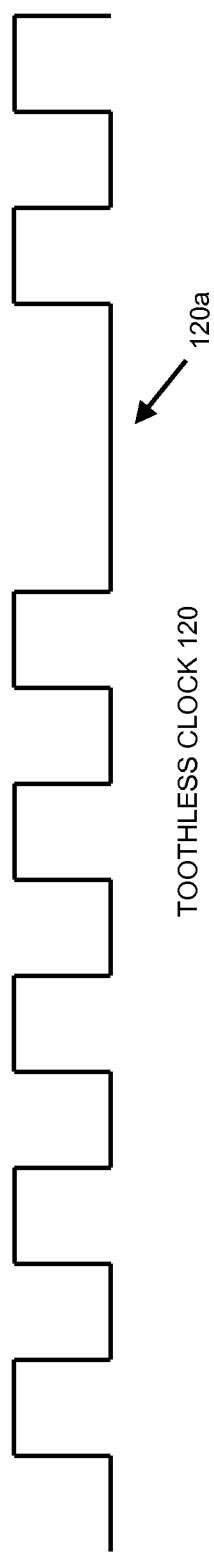
FIG. 2B TOOTHLESS CLOCK 120

SPDIF CLOCK AND DATA RECOVERY WITH SAMPLE RATE CONVERTER

BACKGROUND

A conventional SPDIF (Sony/Philips Digital Interconnect Format) receiver uses a Phase-Locked Loop (PLL) to synchronously sample data to recover the data from a serial stream and simultaneously produces a clock that matches the frequency of the incoming data stream. Other conventional systems recover data from various input data streams, such as bursty data streams, that also generate a clock that matches the frequency of the incoming data stream. Such conventional techniques include PLL failure mechanisms relating to jitter.

BRIEF DESCRIPTION OF THE DRAWINGS

The subject matter disclosed herein is illustrated by way of example and not by limitation in the accompanying figures in which like reference numerals indicate similar elements and in which:

FIG. 2A depicts an exemplary signal diagram for a clock signal output from a rate generator clock of a rate converter according to the subject matter disclosed herein;

FIG. 2B depicts an exemplary signal diagram for a toothless clock signal according to the subject matter disclosed herein.

DETAILED DESCRIPTION

Figure 1:
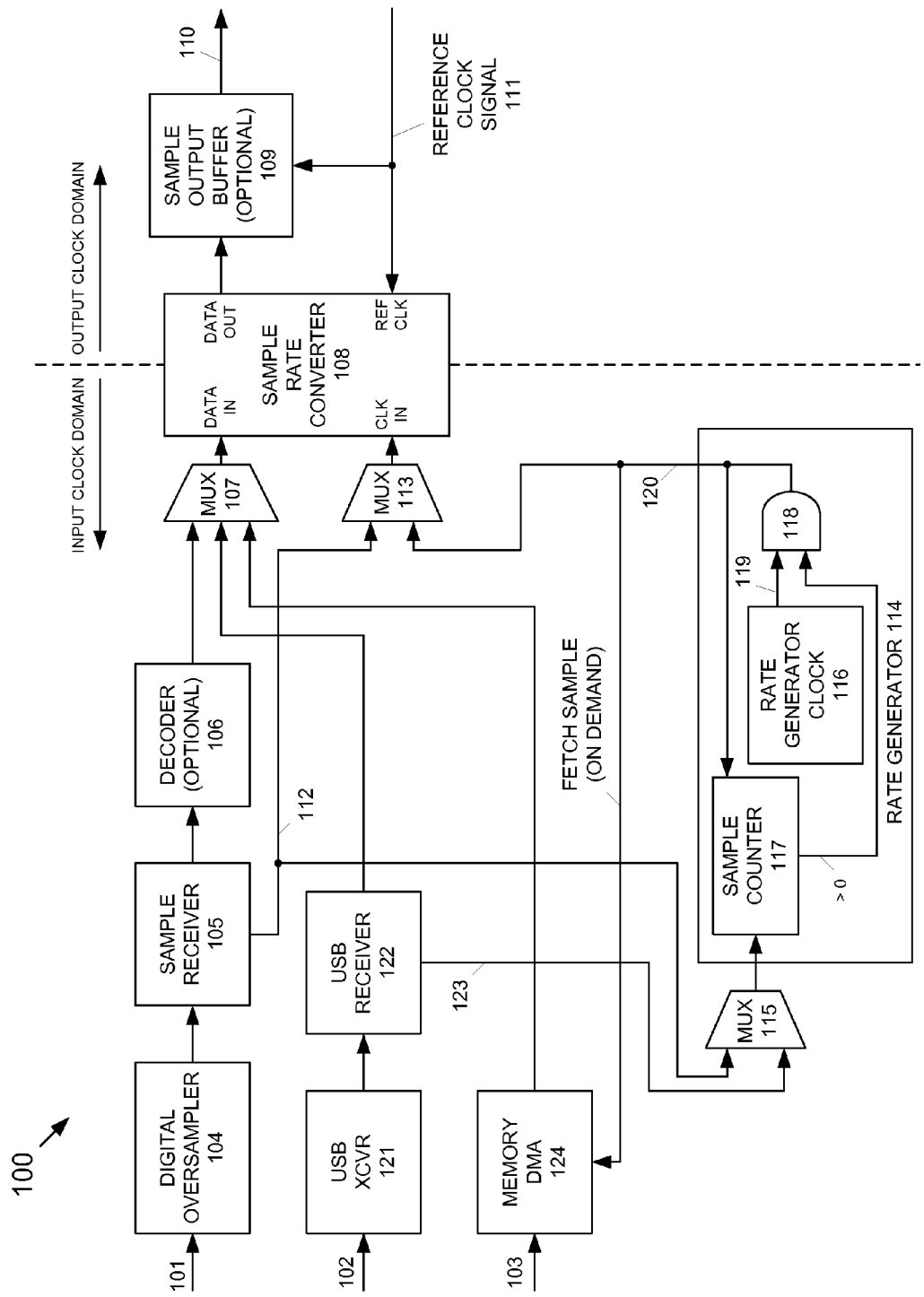
FIG. 1 depicts a functional block diagram of an exemplary configuration of a data recovery system according to the subject matter disclosed herein.

As used herein, the word "exemplary" means "serving as an example, instance, or illustration." Any embodiment described herein as "exemplary" is not to be construed as necessarily preferred or advantageous over other embodiments. Additionally, as used herein, the terms "frame" and "sample" are interchangeable. Further, it will be appreciated that for simplicity and/or clarity of illustration, elements illustrated in the figures have not necessarily been drawn to scale. For example, the dimensions of some of the elements may be exaggerated relative to other elements for illustrative clarity. Further still, in some figures only one or two of a plurality of similar elements indicated by reference characters for illustrative clarity of the figure, whereas all of the similar element may not be indicated by reference characters. It should be understood that although some portions of components and/or elements of the subject matter disclosed herein have been omitted from the figures for illustrative clarity, good engineering, construction and assembly practices are intended.

The subject matter disclosed herein relates to a data recovery system that acquires data from an input data stream without synchronization of an input sampling circuit to the frequency of input data stream. That is, the data recovery system disclosed herein requires no Phase-Locked Loop (PLL) for locking to the incoming data stream, and no clock is produced that is frequency-locked to the input data stream. Accordingly, the power, expense and the failure mechanisms, such as jitter, associated with an analog PLL are avoided. Moreover, the subject matter disclosed herein is capable of replacing existing sample rate converters that utilize an analog PPL.

In one exemplary embodiment, the subject matter disclosed herein outputs a data stream at a selected rate or frequency by determining a count of incoming samples (or frames) and without generating a signal that is frequency-locked to the input data stream in contrast to conventional data recovery systems. In one exemplary embodiment, the input data stream is a linear data stream, such as, but not limited to a SPDIF data stream containing Pulse Code Modulated (PCM) data. In another exemplary embodiment, the input data stream is a nonlinear data stream, such as compressed audio-. In still another exemplary embodiment, the input data stream is based on a communication protocol having bursty characteristics and/or irregular clock characteristics. In yet another exemplary embodiment, the input data stream is generated from a source without a clock.

FIG. 1 depicts a functional block diagram of an exemplary configuration of a data recovery system 100 according to the subject matter disclosed herein. Data recovery system 100 is capable of recovering data from a variety of data sources having different (Sam) ef data stream characteristics. For example, data recovery system 100 comprises a first data recovery path that is capable of recovering data from a SPDIF-type data stream 101. Data recover system 100 also includes a second data recovery path that is capable of recovering data from a Universal Serial Bus-type (USB-type) data stream 102, and a third data recovery path that is capable of recovering data that is generated from a source having no clock, such as data 103 read from a file. As depicted in FIG. 1, the left part of data recovery system 100 can be considered to operate under the domain of an input clock or signal, whereas the right part of data recover system 100 can be considered to operate under the domain of an output clock. The division between the two clock domains is generally indicated in FIG. 1 by a heavy dashed vertical line.

A first data recovery path that is capable of recovering SPDIF-type data 101 comprises a digital oversampler 104, a sample receiver 105, an optional decoder 106, multiplexer (MUX) 107, a sample rate converter 108, and an optional sample output buffer 109. Input SPDIF-type data stream 101 may, for example, comprise a SPDIF data stream that is output from a CD player or a Digital Audio Tape (DAT) player and that may be slightly off frequency and/or may be not as stable a signal as desired. An output data stream 110 is synchronized to a stable reference clock signal 111, such as a crystal-controlled clock signal.

Digital oversampler 104 oversamples the input SPDIF-type data 101 in a well-known manner and is capable of detecting and recovering each sample, or frame, of input SPDIF-type data stream 101. In one exemplary embodiment, digital oversampler 104 oversamples SPDIF-type data stream 101 at a rate that is about a thousand times greater than the input frequency of the samples of SPDIF-type data stream 101 in order to properly determine the data in the presence of noise and jitter that may accompany the input data stream in order to make as accurate a determination of the samples as possible. Such an exemplary oversampling rate, however, is not limiting according to the subject matter disclosed herein.

Sample receiver 105 receives and accumulates the samples (or frames) of the input data stream determined by digital oversampler 104. Optional decoder 106 can be included to decode nonlinear data, such as, but not limited to, compressed data. When data recovery system 100 is configured to receive SPDIF-type data, MUX 107 is controlled in a well-known manner to select and pass the received samples to sample rate converter 108. Each time a frame is input to sample receiver 105 from digital oversampler 104, a pulse signal 112 is output to the clock input of sample rate converter 108 through a multiplexer (MUX) 113. MUX 113 is controlled in a well-known manner to select and pass pulse signal 112 to the clock input of sample rate converter 108.

If the SPDIF-type data input stream 101 is a sufficiently regular signal, such that the samples are more or less properly spaced and can be filtered directly by sample rate converter 108, then pulse signal 112 can be used as a control signal for signaling the arrival of each input sample to sample rate converter 108. If the SPDIF-type data input stream 101 is not a sufficiently regular signal, that is, that the samples cannot be filtered directly by sample rate converter 108 (referred to herein as an "irregular" SPDIF-type data input stream), pulse signal 112 is input to a rate generator 114 through a multiplexer (MUX) 115. MUX 115 is controlled in a well-known manner to select and pass pulse signal 112 to rate generator 114. Additionally, MUX 113 is controlled in a well-known manner to select and pass output clock 120 to the clock input of sample rate converter 108.

Rate generator 114 includes a rate generator clock 116, a sample counter 117 and an AND gate 118. Rate generator clock 116 is configured to output a clock signal 119 that has a frequency selected to be greater than or equal to the expected frequency of irregular SPDIF-type input data stream 101. Rate generator clock 116 can be a simple digital counter without special considerations for signal quality and/or jitter. In one exemplary embodiment, the frequency of clock signal 119 is selected to be about 49 kHz. It should be understood that other frequencies could be selected for the frequency of clock signal 119 as long as the selected frequency is greater than or equal to the expected frequency of irregular SPDIF-type input data stream 101. FIG. 2A depicts an exemplary signal diagram for clock signal 119 of rate generator clock 116.

As sample receiver 105 receives samples, sample counter 117 of rate generator 114 is incremented for each received sample. If, for example, a SPDIF data stream 101 is being received from a Digital Audio Tape (DAT), the expected number of samples that will be received in 1 msec would be 48 (i.e., the frequency of the received SPDIF data stream would be about 48 kHz). If, for example, a SPDIF data stream 101 is being received from CD, the expected number of samples that will be received in 998 µsec would be 44 (i.e., the frequency of the received SPDIF data stream would be about 44.1 kHz). Rate generator clock 116 outputs clock signal 119 to one input of AND gate 118. The other input of AND gate 118 is coupled to the output of sample counter 117.

As long as the output of sample counter 117 is greater than zero, clock signal 119 is gated through AND gate 118 and output as a clock signal 120, referred to herein as a "toothless" clock signal 120 because some of the clock pulses ("teeth") will missing when the output of sample counter 117 equals zero. FIG. 2B depicts an exemplary signal diagram for toothless clock signal 120 having a toothless portion 120a. Toothless clock signal 120 is input to the clock input of sample rate converter 108 through MUX 113, and to the decrement input of sample counter 117. In this configuration, MUX 113 is controlled in a well-known manner to select and pass toothless clock signal 120 to the clock input of sample rate converter 108. Each clock pulse of toothless clock 120 causes sample rate converter 108 to clock in one received sample from sample receiver 105, and to decrement sample counter 117 if the output of sample counter 117 is greater than zero. It should be understood that other logical configurations could be used than that disclosed herein that generate a toothless clock according to the subject matter disclosed herein.

Because clock signal 119 is selected to have a frequency that is greater or equal to than the expected frequency of the input data stream, when sample counter 117 outputs a zero, AND gate 118 blocks one or more clock pulses of clock signal 119, thereby creating the exemplary clock signal depicted in FIG. 2B that has the number of clock pulses that exactly matches the number of (irregular) SPDIF-type samples arriving at sample receiver 105. Toothless clock signal 120, which appears as a normal-type clock signal to sample rate converter 108 has no phase noise during "toothless" gaps because clock pulses are gated away, not shifted in phase. The frequency of rate generator clock 116 is selected to run at a rate that is equal to or greater than the sample rate of the input data stream so the samples input to sample rate converter 108 do not cause an overflow. In an alternative exemplary embodiment, the frequency of rate generator clock 116 can be controlled based on a monitored buffer (not shown) in sample receiver 105, which would introduce changes in phase and frequency for toothless clock 120.

Sample rate converter 108 clocks in and accumulates samples from sample receiver 105 at the rate of toothless clock 120. Sample rate converter 108 interpolates in a well-known manner the received samples to produce, in one exemplary embodiment, a PCM output data stream, which is then clocked into optional sample output buffer 109 at the frequency provided by reference clock signal 111. The output data stream 110 is then clocked out of sample output buffer 109 at the rate of reference clock signal 111. In an alternative exemplary embodiment, sample output buffer 109 is not used and output data stream 110 is output directly from sample rate converter 108. In one exemplary embodiment, clock signal 111 is a crystal-control clock signal having a suitably low phase noise. In another exemplary embodiment, the frequency of clock signal 111 is selected based on the desired type of data stream output. That is, the output clock of sample rate converter 111 does not need to be the same as the incoming sample rate. This is a benefit when circuitry following sample rate converter 108 is designed to operate at a frequency different from the frequency of the incoming data stream.

In one exemplary embodiment, data recovery system 100 comprises a second data recovery path that is capable of recovering data from an input data stream 102 having bursty-type characteristics. For example, input data stream 102 could be, but is not limited to, a Universal-Serial-Bus-based (USB-based) communication protocol, a wireless-data-based communication protocol, or a Bluetooth-based communication protocol. The second data recovery path comprises a USB-type transceiver (XCVR) 121, a USB sample receiver 122, MUX 107, sample rate converter 108 and (optional) sample output buffer 109. USB XCVR 121 operates in a well-known manner to receive USB-type data, and the received USB-type data is output to USB sample receiver 122. USB sample receiver 122 receives and accumulates the samples (or frames) of input USB-type data stream 102. Each time a frame is input to USB sample receiver 122, a pulse signal 123 is output to sample counter 117 of rate generator 114 through MUX 115. MUX 115 is controlled in a well-known manner to select and pass pulse signal 123 to sample counter 117.

For this exemplary embodiment, the frequency of clock signal 119 is selected to be about 49 kHz. It should be understood that other frequencies could be selected for clock signal 119 as long as the selected frequency is close to and greater than or equal to the frequency of USB-type input data stream 102. It should be understood, though, that if a frequency significantly greater than the expected rate of the input data stream is used for rater generator clock 116, toothless clock 120 will have relatively more missing pulses, thereby making toothless clock 120 noisier for sample rate converter 108 to filter. As USB sample receiver 122 receives samples, a sample counter 117 is incremented for each received sample. As described previously, as long as the output of sample counter 117 is greater than zero, clock signal 119 is gated through AND gate 118 and output as toothless clock signal 120. Toothless clock signal 120 is input to the clock input of sample rate converter 108 through MUX 113, and to decrement sample counter 117 if the output of sample counter 117 is greater than zero. MUX 113 is controlled in a well-known manner to select and pass toothless clock signal 120 to the clock input of sample rate converter 108. Each clock pulse of toothless clock 120 causes sample rate converter 108 to clock in one received sample from USB receiver 122, while decrementing sample counter 117 if the output of sample counter 117 is greater than zero.

Sample rate converter 108 clocks in and accumulates samples from USB sample receiver 122 at the rate of toothless clock 120. In this situation, MUX 107 is controlled to select and pass the samples from USB receiver 122. Sample rate converter 108 interpolates in a well-known manner the received samples between to produce, in one exemplary embodiment, a PCM output data stream, which is then clocked into (optional) sample output buffer 109 at the frequency provided by reference clock signal 111.

In one exemplary embodiment, data recovery system 100 comprises a third data recovery path that is capable of recovering data 103 that is generated from a source having no clock, such as data read from a file through Direct Memory Access (DMA) 124. In this exemplary embodiment, the frequency of rate generator clock 116 is set to a rate that matches closely the rate at which the file was recorded to play, which is the rate that the samples will be read out memory DMA 124. It should be understood that if the frequency of rate generator clock 116 is selected to differ significantly from the recording frequency of the file, then the audio content of the file will be frequency shifted when played. The frequency of rate generator clock 119 need not match the frequency of reference clock 111. Sample rate converter 108 may convert the output data stream to the different frequency of reference clock 111 without a frequency shift. Clock signal 119 output from rate generator clock 116 is used to both read the samples from memory 124 and signal sample rate converter 108 about input samples.

Figure 3:
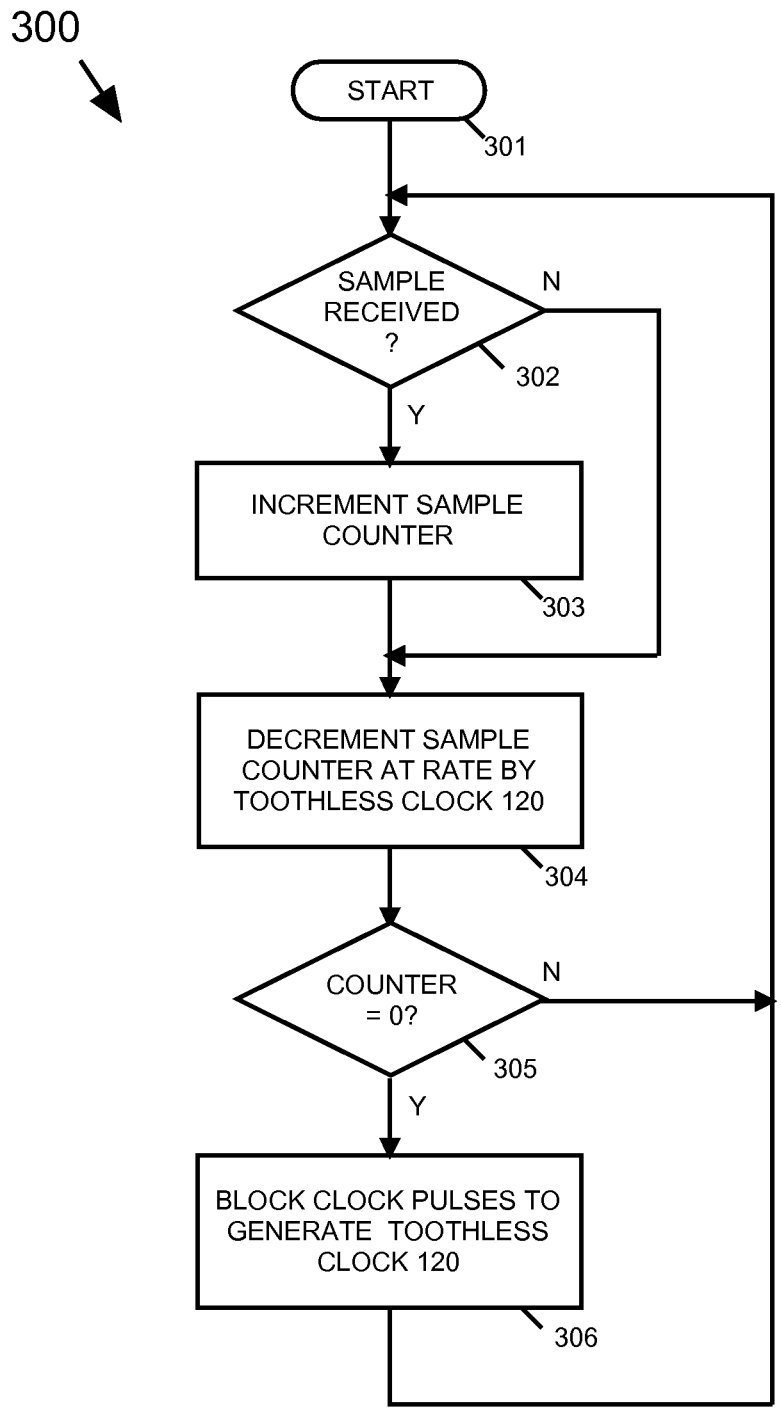
FIG. 3 depicts a flow diagram for one exemplary embodiment of a technique for acquiring data from an input data stream without synchronization of an input sampling circuit to the input data stream according to the subject matter disclosed herein.

FIG. 3 depicts a flow diagram for one exemplary embodiment of a technique 300 for acquiring data from an input data stream without synchronization of an input sampling circuit to the input data stream according to the subject matter disclosed herein. The process is entered at 301. If, at 302, it is determined that a sample of the input data stream has been received, flow continues to 303 where sample counter 117 is incremented. Flow continues to 304.

If, at 302, it is determined that a sample of the input data stream has not been received, flow continues to 304 where sample counter 117 is decremented by toothless clock 120 at the rate of rate generator clock signal 119. At 305, it is determined whether the output of sample counter 117 is zero. If not, flow returns to 302 and the process continues. If, at 305, the output of sample counter 117 is determined to be zero, flow continues to 306 where pulses of rate generator clock 119 are blocked to generate a toothless portion (i.e., 120a in FIG. 2B) of toothless clock 120. Flow returns to 302 and the process continues.

Although the foregoing disclosed subject matter has been described in some detail for purposes of clarity of understanding, it will be apparent that certain changes and modifications may be practiced that are within the scope of the appended claims. Accordingly, the present embodiments are to be considered as illustrative and not restrictive, and the subject matter disclosed herein is not to be limited to the details given herein, but may be modified within the scope and equivalents of the appended claims.

What is claimed is:

1. A data recovery system, comprising:
a first clock signal generator to generate a first clock signal comprising a frequency that is greater than or equal to an expected frequency of an input data stream;
a sample counter to increment a sample count in response to a sample received in the input data stream and to decrement the sample count in response to a second clock signal; and
a second clock signal generator to generate the second clock signal from the first clock signal by passing the first clock signal if the sample count of the sample counter does not equal a predetermined sample count value and by blocking the first clock signal if the sample count equals the predetermined sample count value.

2. The data recovery system according to claim 1, further comprising:
a sample receiver to receive samples of the input data stream; and
a sample rate converter to receive the samples of the input data stream from the sample receiver at a rate of the second clock signal, the sample rate converter to interpolate the received samples to generate an output data stream having a selected frequency.

3. The data recovery system according to claim 2, wherein the input data stream comprises a Sony/Philips Digital Interconnect Format (SPDIF) data stream.

4. The data recovery system according to claim 2, wherein the input data stream comprises bursty input data stream.

5. The data recovery system according to claim 2, wherein the input data stream is a Universal Serial Bus-type (USB-type) data stream, a data stream comprising a USB-based communication protocol, a data stream comprising a wireless-data-based communication protocol, or a data stream comprising a Bluetooth-based communication protocol.

6. The data recovery system according to claim 2, wherein the input data stream is generated from a data file.

7. The data recovery system according to claim 2, wherein the input data stream comprises non-linear data, and
the data recovery system further comprising a decoder coupled between the sample receiver and the sample rate converter to decode the non-linear data before the samples of the input data stream are received by the sample rate converter.

8. The data recovery system according to claim 7, wherein the non-linear data comprises compressed audio data.

9. A data recovery system, comprising:
a sample receiver to receive samples of an input data stream;
a first clock signal generator to generate a first clock signal comprising a frequency that is greater than or equal to an expected frequency of the input data stream;
a sample counter to increment a sample count in response to a received sample in the input data stream and to decrement the sample count in response to a second clock signal;
a gating device coupled to the first clock signal and responsive to the sample count of the sample counter to generate the second clock signal by passing the first clock signal if the sample does not equal a predetermined sample count value and by blocking the first clock signal if the sample count equals the predetermined sample count value; and a sample rate converter to receive the samples of the input data stream from the sample receiver at a rate of the second clock signal, the sample rate converter to interpolate the received samples to generate an output data stream having a selected frequency.

10. The data recovery system according to claim 9, wherein the input data stream comprises bursty data characteristics.

11. The data recovery system according to claim 9, wherein the input data stream is a Universal Serial Bus-type (USB-type) data stream, a data stream comprising a USB-based communication protocol, a data stream comprising a wireless-data-based communication protocol, or a data stream comprising a Bluetooth-based communication protocol.

12. The data recovery system according to claim 9, wherein the input data stream is generated from a data file.

13. The data recovery system according to claim 9, wherein the input data stream comprises non-linear data, and the data recovery system further comprising a decoder coupled between the sample receiver and the sample rate converter to decode the non-linear data before the samples of the input data stream are received by the sample rate converter.

14. The data recovery system according to claim 13, wherein the non-linear data comprises compressed audio data.

15. A method, comprising
generating a first clock signal comprising a frequency that is greater than or equal to an expected frequency of an input data stream;
incrementing a sample count in response to a received sample in the input data stream;
decrementing the sample count in response to a second clock signal; and
generating the second clock signal from the first clock signal by passing the first clock signal if the sample count of the sample counter does not equal a predetermined sample count value and by blocking the first clock signal if the sample count equals the predetermined sample count value.

16. The method according to claim 15, further comprising:
receiving the samples of the input data stream at a rate of the second clock signal; and
interpolating the received samples to generate an output data stream having a selected frequency.

17. The method according to claim 16, wherein the input data stream comprises bursty data characteristics.

18. The method according to claim 16, wherein the input data stream is a Universal Serial Bus-type (USB-type) data stream, a data stream comprising a USB-based communication protocol, a data stream comprising a wireless-data-based communication protocol, or a data stream comprising a Bluetooth-based communication protocol.

19. The method according to claim 16, wherein the input data stream is generated from a data file.

20. The method according to claim 16, wherein the input data stream comprises non-linear data, and
the method further comprising decoding the non-linear data before the samples of the input data stream are received by the sample rate converter.

* * * * *